United States Patent
Wei et al.

(10) Patent No.: US 9,014,555 B2
(45) Date of Patent: Apr. 21, 2015

(54) METHOD AND DEVICE FOR RECEIVING OPTICAL SIGNALS

(71) Applicant: Industrial Technology Research Institute, Hsinchu (TW)

(72) Inventors: Chia-Chien Wei, Taichung (TW); Hsing-Yu Chen, Taipei (TW); Dar-Zu Hsu, Hsinchu County (TW); Jye-Hong Chen, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 88 days.

(21) Appl. No.: 13/726,229

(22) Filed: Dec. 24, 2012

(65) Prior Publication Data
US 2014/0119726 A1    May 1, 2014

Related U.S. Application Data

(60) Provisional application No. 61/718,713, filed on Oct. 26, 2012, provisional application No. 61/719,500, filed on Oct. 29, 2012.

(51) Int. Cl.
*H04B 10/61* (2013.01)
*H04B 10/69* (2013.01)

(52) U.S. Cl.
CPC .......... *H04B 10/616* (2013.01); *H04B 10/6971* (2013.01)

(58) Field of Classification Search
CPC ...... H04B 1/10; H04B 7/005; H04B 10/6971; H04B 15/00
USPC .................................. 398/202–204, 207–211
See application file for complete search history.

(56) References Cited

U.S. PATENT DOCUMENTS

| | | | |
|---|---|---|---|
| 5,866,896 | A | 2/1999 | Georgiades et al. |
| 7,796,898 | B2 | 9/2010 | Armstrong |
| 8,233,799 | B2 | 7/2012 | Lowery |
| 8,737,458 | B2 * | 5/2014 | Eliaz et al. ................... 375/230 |
| 2007/0070932 | A1 * | 3/2007 | Doron et al. ................. 370/328 |

(Continued)

FOREIGN PATENT DOCUMENTS

| | | |
|---|---|---|
| TW | 200950390 | 12/2009 |
| TW | 201134150 | 10/2011 |
| TW | 201220730 | 5/2012 |

OTHER PUBLICATIONS

Schuster et al, "Spectrally Efficient Compatible Single-Sideband Modulation for OFDM Transmission With Direct Detection," IEEE Photonics Technology Letters 20(9), May 1, 2008, pp. 670-672.

(Continued)

*Primary Examiner* — Dzung Tran
(74) *Attorney, Agent, or Firm* — Jianq Chyun IP Office

(57) ABSTRACT

A method for receiving optical signals and a device using the same method are provided herein. The method includes the elements of receiving an input signal which includes a signal component and an interference component, wherein the interference component is subcarrier to subcarrier intermixing interference (SSII). The input signal is first converted into a frequency domain signal. The interference component of the input signal is estimated based on a mathematical model according to at least a dynamic chirp component and a static chirp component. The interference component is then cancelled from the input signal to obtain an output signal.

30 Claims, 5 Drawing Sheets

(56) References Cited

U.S. PATENT DOCUMENTS

| | | | |
|---|---|---|---|
| 2009/0067833 A1 | 3/2009 | Bunge et al. | |
| 2011/0249978 A1 | 10/2011 | Sasaki | |
| 2012/0327757 A1* | 12/2012 | Wang et al. | 370/208 |

OTHER PUBLICATIONS

Chia-Chien Wei, "Small-signal analysis of OOFDM signal transmission with directly modulated laser and direct detection," Optics Letters 36(2), Jan. 15, 2011, pp. 151-153.

Mehedy et al., "Frequency Interleaving Towards Spectrally Efficient Direct Detection Based Optical OFDM Systems," 15th OptoElectronics and Communications Conference (OECC2010) Technical Digest, Jul. 2010, pp. 476-477.

Peng et al., "Spectrally Efficient Direct-Detected OFDM Transmission Incorporating a Tunable Frequency Gap and an Iterative Detection Techniques," Journal of Lightwave Technology 27(24), Dec. 15, 2009, pp. 5723-5735.

Cao et al, "Direct-Detection Optical OFDM Transmission System Without Frequency Guard Band," IEEE Photonics Technology Letters 22(11), Jun. 1, 2010, pp. 736-738.

Peng et al., "Enabling High Capacity Direct-Detection Optical OFDM Transmissions Using Beat Interference Cancellation Receiver," 2010 36th European Conference and Exhibition on Optical Communication (ECOC), Sep. 19-23, 2010, pp. 1-3.

Chia-Chien Wei, "Analysis and iterative equalization of transient and adiabatic chirp effects in DML-based OFDM transmission systems," Optics Express 20(23), Nov. 2012, pp. 25774-25789.

"Notice of Allowance of Taiwan Counterpart Application", issued on Nov. 17, 2014, p. 1-p. 4.

* cited by examiner

METHOD AND DEVICE FOR RECEIVING OPTICAL SIGNALS

CROSS-REFERENCE TO RELATED APPLICATION

This application claims the priority benefits of U.S. provisional application Ser. No. 61/718,713, filed on Oct. 26, 2012, and U.S. provisional application Ser. No. 61/719,500, filed on Oct. 29, 2012. The entirety of each of the above-mentioned patent applications is hereby incorporated by reference herein and made a part of this specification.

TECHNICAL FIELD

The present disclosure generally relates to a method for receiving optical signals and a device using the same.

BACKGROUND

As the optical communication industry journeys toward a more advanced version of the next generation passive optical network standard (e.g. NGPON2) which requires a 40 gigabits per second transmission rate over 100 kilometers (km) of signal transmission over fiber, the performance of conventional optical transmission systems such as ones which utilize an Intensity-Modulation Direct Detection (IMDD) technique may fall short of the required standard even though an IMDD based device could be inexpensive and simple to design. Also since the conventional On-OFF keying (OOK) modulation technique is bandwidth inefficient, the Orthogonal Frequency-Division Multiplexing (OFDM) modulation technique which is more bandwidth efficient in comparison to the OOK modulation technique may become an enhancement.

The conventional IMDD based system may be restricted by radio frequency (RF) power fading. More specifically, when a signal, for example, an electromagnetic (EM) signal, is amplitude or intensity modulated, normally a double sideband is formed in the frequency domain. As the modulated EM signal traverses through the fiber, the modulated EM signal experiences from the fiber a dispersive effect which causes each side of the double sideband to phase rotate in the opposite direction. After the EM signal is received by an optical receiver, the RF power fading occurs in the received EM signal due to the effect of the destructive/non-constructive interference of the phase rotation of each of the double sidebands. As the EM signal propagates down the fiber, the worsening effect of the RF power fading becomes more and more apparent. Therefore, a solution which involves an optical single sideband modulation technique has been proposed.

Supposedly, if an EM signal only contains a single sideband, the problem of RF fading would not ensue. However, the means to achieve the single sideband modulation may require the Mach-Zehnder modulator (MZM) which could be twenty times more expensive than the direct modulation laser (DML). Also, the modulation method of the MZM modulator is amplitude modulation. After a modulated EM wave is received by an optical receiver, signal to signal beat interference (SSBI) with the same bandwidth as the single side band signal may occur in the lower frequency spectrum of the EM signal. Therefore, in order to accommodate this type of system, a guard band is usually needed which would then result in twice the transmission bandwidth. Based on this reason, an improvement based on the conventional IMDD technique to realize the required high speed transmission for the next generation passive optical network (NGPON) may still be feasible.

SUMMARY

Accordingly, the present disclosure is directed to a method of receiving optical signals for use in an optical communication device, and the method includes the steps of receiving from an optical receiver an input signal comprising a signal component and an interference component, wherein the interference component is subcarrier to subcarrier intermixing interference (SSII), converting the input signal into a frequency domain input signal, estimating the interference component according to at least a dynamic chirp component and a static chirp component, and cancelling the interference component from the frequency domain input signal to obtain a second signal.

Accordingly, the present disclosure is directed to an optical communication device which includes the elements of a receiver and a processor unit which is coupled to the receiver, wherein the receiver receives an input signal comprising a signal component and an interference component, and the processing unit is configured to perform the function of converting the input signal into a frequency domain input signal, estimating the interference component, wherein the interference component is characterized by at least a dynamic chirp component and a static chirp component, and cancelling the interference component from the frequency domain input signal to obtain a second signal.

In order to make the aforementioned features of the disclosure comprehensible, embodiments accompanied with figures are described in detail below. It is to be understood that both the foregoing general description and the following detailed description are exemplary, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DETAILED DESCRIPTION OF DISCLOSED EMBODIMENTS

As the result of the RF fading phenomenon, the useful spectrum of a IMDD based optical communication system could be limited according to the frequency and distance of the signal transmission. However, by using the OFDM modulation technique the useful bandwidth could be extended by transmitting information in an upper frequency band. Even though it has been discovered that the upper frequency band could suffer a deduction of the signal to noise ratio due to the subcarrier to subcarrier intermixing interference (SSII), the SSII can nevertheless be calculated and then subsequently cancelled from the received signal according to the proposal of the present disclosure. Please note that the SSII is not related to SSBI as they transpire due to the result of two very different mechanisms. The SSII can be calculated according to a signal after fiber mathematical model by taking into account a static chirp value of the modulator, a dynamic chirp value as a function of the signal strength, the OFDM input signal, and the phase rotation due to signal dispersion. The dynamic chirp value can be adjusted or fine tuned based on an initial SSII estimation in comparison with a correlation estimation with an actual measured error power of signal and thus further improves the accuracy of the estimated SSII signal. Based on the proposal of the present disclosure and actual experimental data, the proposed system is then able to increase the useful bandwidth of an IMDD communication system on the order of several gigahertz (GHz) over 100 km of fiber.

Figure 1:
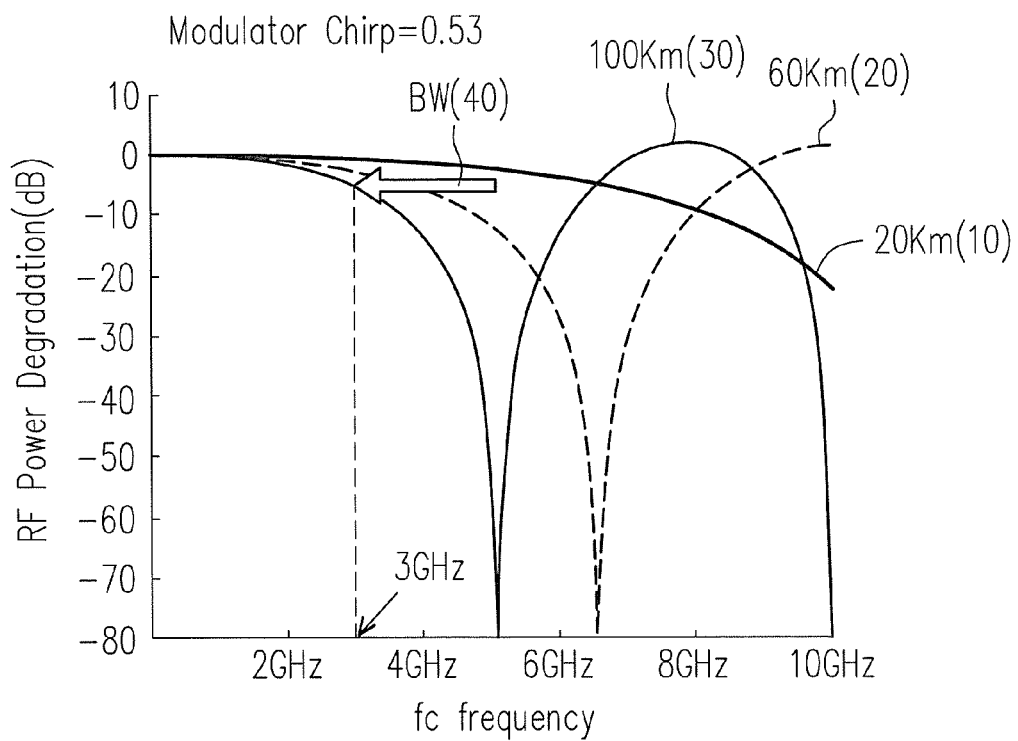
FIG. 1 illustrates a typical frequency response using double sideband signal under RF power fading as a function of propagation distance using a modulator with a static modulator chirp of 0.53.

FIG. 1 illustrates a typical frequency response using double sideband signal under RF power fading as a function of propagation distance using a modulator with a static modulator chirp of 0.53 under the IMDD system. The horizontal axis is the signal frequency over fiber in units of gigahertz (GHz), and the vertical axis is the RF power degradation in units of decibels (dB). For propagation length of 20 kilometer (km) (10), it is evident that RF power degradation worsens as signal frequency increases. For propagation length of 60 km (20) however, the degradation due to RF power fading is more pronounced. After a signal propagates for 60 km (20), the signal would experience complete destructive interference at some point between 6 GHz to 7 GHz because of the power fading. After a signal propagates for 100 km (30), the complete destruction interference occurs around 5 GHz, and its bandwidth (40) would only be around 3 GHz. However, for the signal frequency beyond 6.5 GHz, there exists a second or upper frequency band for the propagation distance of 100 km (30) beyond the frequency of the complete destructive interference. The idea would be to transmit a signal over fiber through the upper frequency band by using the OFDM technique, and thus, the useful bandwidth of an optical communication system could increase twofold.

Figure 2:
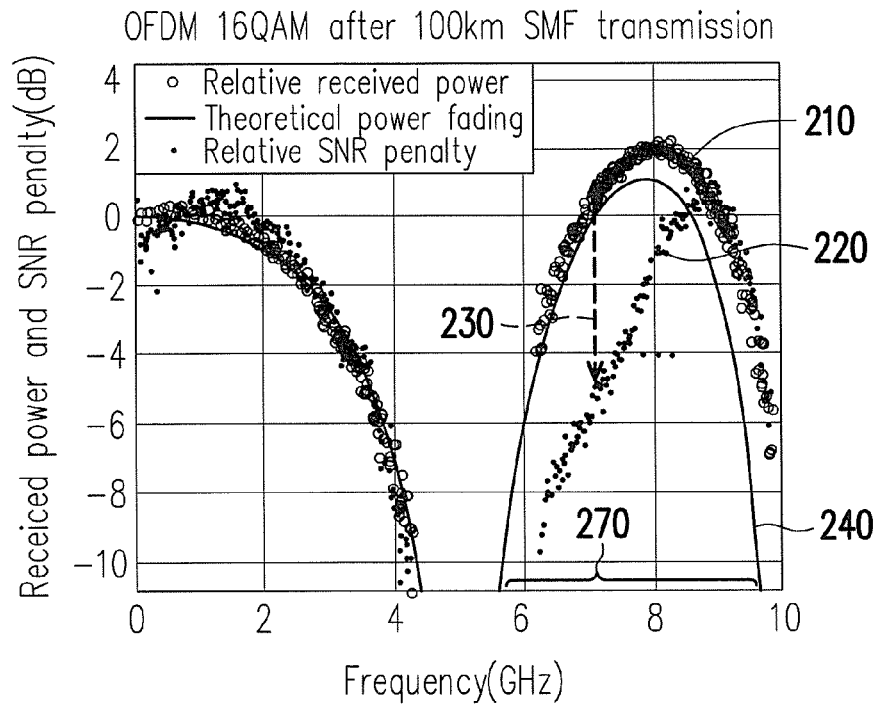
FIG. 2 illustrates the received power loss and the signal to noise ratio (SNR) penalty after a two bands OFDM signal propagates over 100 kilometers.

However, transmitting signals over an upper frequency band is not without challenges in addition to the RF power fading. FIG. 2 illustrates an actual experimental data of an OFDM 16 quadrature amplitude modulation (QAM) signal after traveling through 100 km of a single mode fiber (SMF). The relative received power (210) contains a lower frequency bands spanning from 0 to over 4 GHz and a higher frequency band spanning from less than 6 GHz to about 10 GHz. However, it is discovered from the experimental data that the higher frequency band actually possesses a significant amount of Subcarrier to Subcarrier intermixing interference (SSII) which is an interference not related to the theoretical RF power fading (240) or relative received power (210). This SSII causes an additional SNR penalty (230) for the received signals as the additional SNR penalty (230) can be observed from the gap between the relative received power (210) and the relative SNR penalty (220). In other words, the SNR of the received signal could be significantly lowered because of the SSII. In order to increase the useful bandwidth of the higher frequency band (270), the SSII may be calculated and eliminated.

In order to calculate the SSII, first a theoretical/mathematical model of the SSII could be established. To obtain an accurate estimate of the SSII, the modulator chirp is to be considered. For each IMDD based modulator, there is a chirp factor which affects the speed of the RF fading as well as how SSII is generated. Also the modulator chirp varies according to the signal strength of the modulated signal. Therefore, the dynamic property of the modulator chirp may also be considered.

The signal in the time domain after electrical to optical conversion can be mathematically presented as equation (1) as follows:

Signal after electrical to optical (E/O) conversion = \hfill eq(1)

$$(1+x)^{\frac{1-j(\alpha_0+\alpha_1 x)}{2}} = 1 + \frac{1-j\alpha_0}{2}x - \frac{1}{8}(1+\alpha_0^2+4j\alpha_1)x^2$$

$$\text{Wherein } x = OFDM \text{ signal} = \sum_{n=1}^{N} i_n \cdot \cos(nwt + \theta_n),$$

and n is the number of OFDM carriers, $i_n$ is amplitude of $n^{th}$ subcarrier, and j is imaginary unit.

The third and higher order terms of x in equation 1 are discarded, and $\alpha_0$ and $\alpha_1$ are due to the chirp of optical modulator. The $\alpha_0$ value could be considered as a static chirp parameter, such $\alpha_0$ is inherent for every modulator and is fixed so that it can be known for each modulator after it is produced from a factory. The $\alpha_1$ value could be considered as a dynamic chirp parameter, as it is dependent upon the amplitude of an input signal to a modulator.

Next, the signal traveling through a fiber can be characterized according to equation 2 as follows:

Signal after fiber = \hfill eq(2)

$$1 + \frac{1-j\alpha_0}{2}(xe^{jn^2\theta_D}) - \frac{1}{8}(1+\alpha_0^2+4j\alpha_1)(x^2 e^{jn^2\theta_D})$$

Wherein $\theta_D$ is the signal phase rotation due to the dispersion of the fiber. Since a fiber could impart a signal dispersion, the signal after the fiber transmission would induce different phase shifts at different subcarriers.

After the signal is received by a photo detector, the received signal is direct detected by a square law photo detector can be characterized by equation 3 as follows:

Signal after detection = $\Big[1 +$ \hfill eq(3)

$$\frac{1-j\alpha_0}{2}(xe^{jn^2\theta_D}) - \frac{1}{8}(1+\alpha_0^2+4j\alpha_1)(x^2 e^{jn^2\theta_D})\Big]\Big[1 +$$

$$\frac{1-j\alpha_0}{2}(xe^{jn^2\theta_D}) - \frac{1}{8}(1+\alpha_0^2+4j\alpha_1)(x^2 e^{jn^2\theta_D})\Big]^*$$

Equation 3 can be re-expressed as the sum of a DC term, a signal term, and a SSII term $$eq(3) = 1 + \frac{1-j\alpha_0}{2}\left(xe^{jn^2\theta_D}\right) + $$
$$\frac{1+j\alpha_0}{2}\left(xe^{jn^2\theta_D}\right)^* \quad (DC + \text{Signal}) + \frac{1+\alpha_0^2}{4}\left(xe^{jn^2\theta_D}\right)\left(xe^{jn^2\theta_D}\right)^* - $$
$$\frac{1}{8}\left[(1+\alpha_0^2+4j\alpha_1)\left(x^2 e^{jn^2\theta_D}\right) + (1+\alpha_0^2-4j\alpha_1)\left(x^2 e^{jn^2\theta_D}\right)^*\right]$$
(SSII)

After fiber transmission, the signal term and the SSII term which is due to the intermixing of the OFDM subcarriers can be used to construct a theoretical model.

Figure 3:
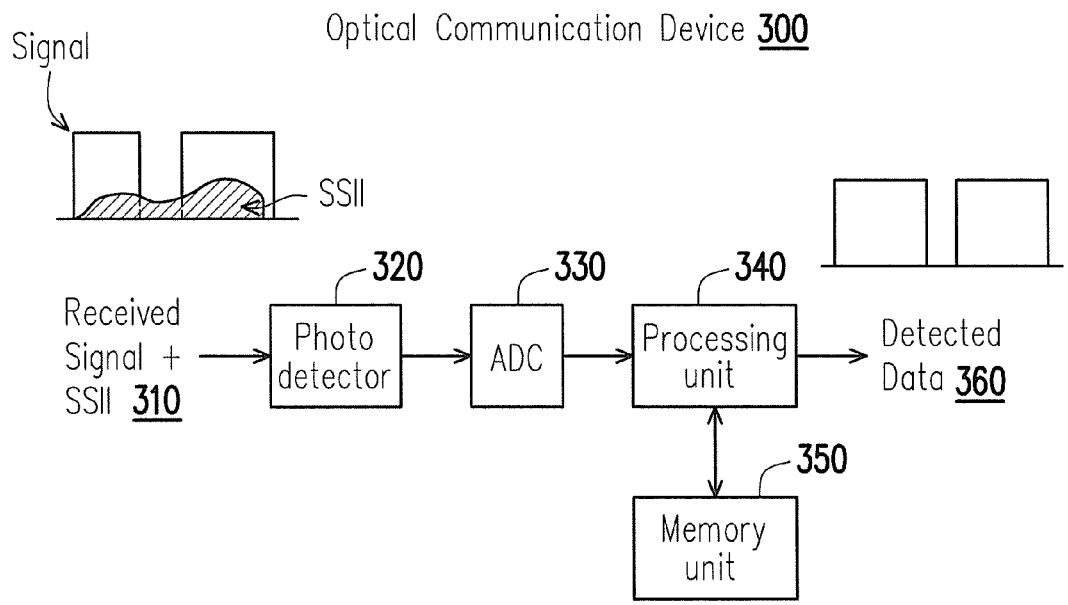
FIG. 3 illustrates an optical communication device in accordance with an exemplary embodiment of the present disclosure.

FIG. 3 illustrates an optical communication device model in accordance with an exemplary embodiment of the present disclosure. The optical communication device includes at least but not limited to these following components including a photo detector (320), an analog to digital converter (ADC) (330), a processing unit (340), and a memory unit (350). The photo detector (320) is coupled to the ADC (330), and the output of the ADC (330) is fed to the processing unit (340) which may be connected to a memory unit (350).

The optical communication device (300) receives a signal which may include a received signal including an aforementioned SSII component (310) and outputs a detected data (360) which is substantially free of the signal contamination of the SSII component. First the received signal with the SSII (310) is direct detected by an photo detector (320) and is converted into an analog electrical signal. The analog electrical signal is then converted into a digital signal by the ADC, and the resulting digital signal is fed into the processing unit (340). The processing unit (340) may include one or more micro processors or a DSP chip and/or at least one controller, and the main purpose of the processing unit (340) is to implement the aforementioned SSII model. The processing unit (340) may also optionally interface with a memory unit (350) which may act as a memory buffer to temporarily store the calculation results of the processing unit (340).

Figure 4:
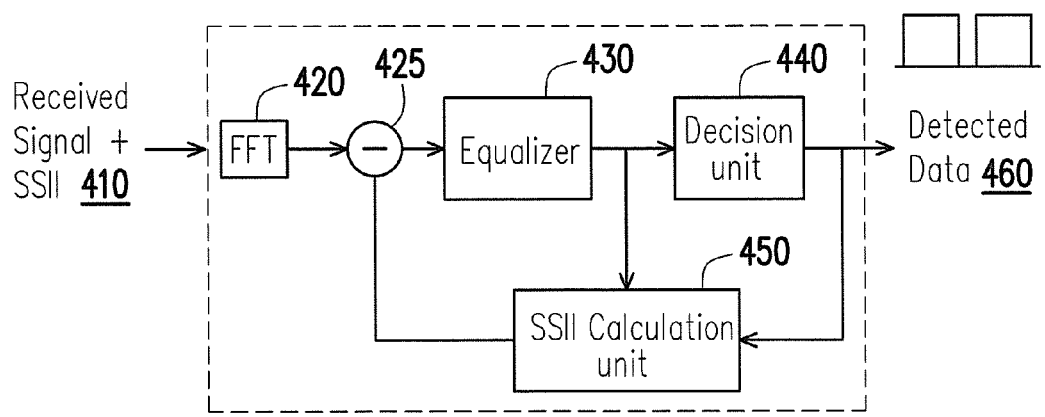
FIG. 4 illustrates a processing unit in accordance with an exemplary embodiment of the present disclosure.

FIG. 4 illustrates in greater detail the processing unit (340) in accordance with an exemplary embodiment of the present disclosure. The processing unit may include at least but not limited to a FFT module (420), a subtraction unit (425), an equalizer (430), a decision unit (440), and a SSII calculation unit (450). The processing unit (340) receives the digitally represented input signal with the SSII contamination (410), processes the signal (410), and outputs the detected signal (460) which is substantially free of SSII components. It should be noted that the received signal with SSII 410 which is input to the processing circuit is different from the received signal in 310 as the received signal 410 in FIG. 4 has been converted into a digital format.

The processing unit first performs Fast Fourier Transform (FFT) on the input signal (410) by the FFT module. For the first iteration, the input signal (410) is sent to the equalizer (430). The equalizer (430) is configured to perform a frequency domain equalization of the received data symbols from the optical channel response. The equalizer (430) may equalize the channel response by reversing the received data symbols with a trained channel response. The channel response could be obtained from performing a channel estimation using a reference or pilot signal. The equalized data symbol is then sent to the decision unit (440) and to the SSII calculation unit (450) to be processed. The decision unit performs decision on the equalized symbol data and output the result as detected data (460) but at the same time send the output to the SSII calculation unit (450) in the feedback loop. The SSII calculation unit (450) based on the data from equalization (430) and the decision unit (440) calculates the estimated SSII component originally present in the input signal (410). For subsequent iterations, the subtraction unit (425) subtract the SSII component from the frequency domain input signal so as to output a detected data (460) virtually free of the SSII signal.

Figure 5:
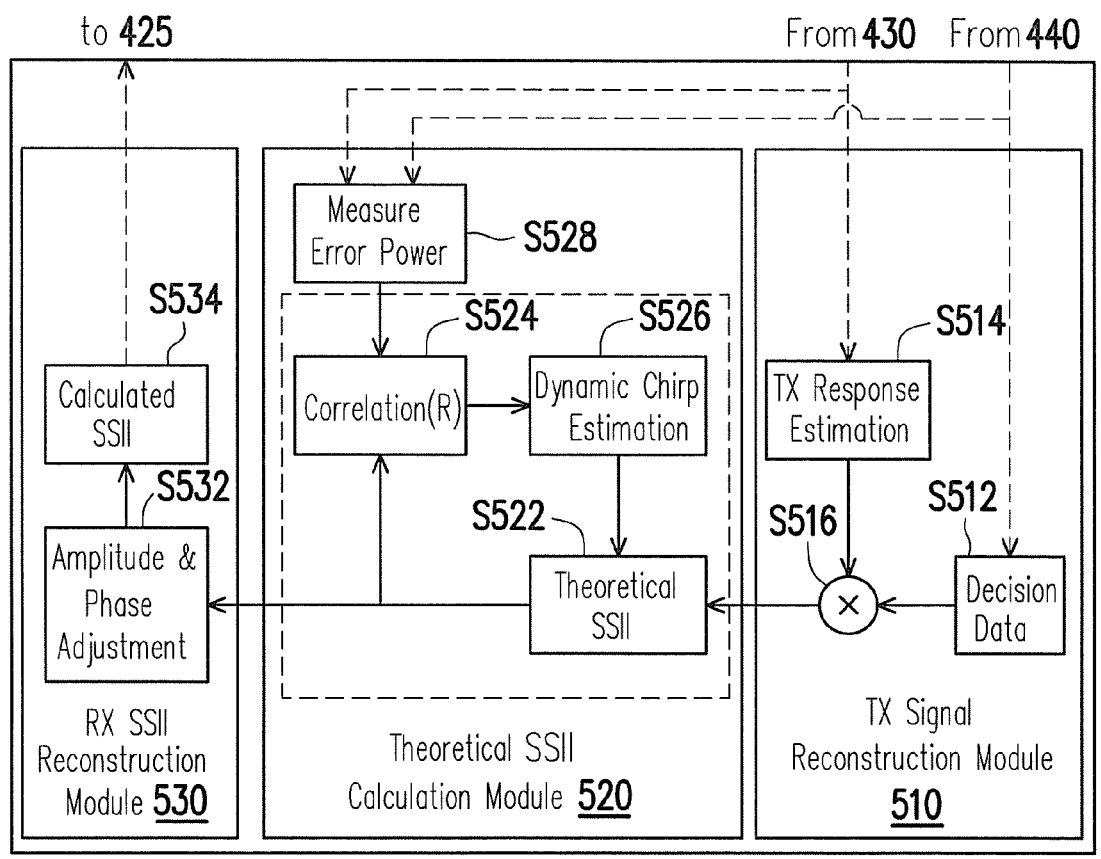
FIG. 5 illustrates a SSII calculation unit in accordance with an exemplary embodiment of the present disclosure.

FIG. 5 illustrates the signal processing steps inside a SSII calculation unit (450) in accordance with an exemplary embodiment of the present disclosure. The SSII calculation unit (450) includes a TX signal reconstruction module (510) coupled to a theoretical SSII calculation module (520), and the output of which is coupled to a Rx SSII Reconstruction Module (530). The purpose of the Tx signal reconstruction module (510) is to reconstruct the signal outputted from the transmitter before the signal traverses through a fiber. The signal outputted from the transmitter is assumed to be modulated by a modulator. The purpose of the theoretical SSII calculation module (520) is to estimate the SSII imparted by the communication system. The purpose of the Rx SSII reconstruction module (530) is to reconstruct the signal received by the photo detector (320).

In S512, the Tx signal reconstruction module (510) receives decision data from the decision unit (440). In S514, the Tx signal reconstruction module (510) receives the equalizer data from the equalizer (430) so as to perform the transmission response estimation. In S516, the decision data gets multiplied by the Tx response estimation and the resulting signal data and resulting signal is the reconstructed signal of the outputted from the transmitter before the signal traverses through a fiber and is sent to the theoretical SSII calculation module (520).

In S522, the theoretical SSII is constructed according to equation 3 according to the constructed signal from the operation of S516, and from the input of a dynamic chirp estimation which is α1 in S526. In order to increase the accuracy of the theoretical SSII calculation, an accurate estimation of the dynamic chirp value, α1, could be iteratively searched. When the selection of the dynamic chirp value, α1, leads to a theoretically calculated SSII which correlates strongly with the measured error power, it can be known that the SSII number is accurate. Thus, the output of the theoretical SSII calculation from S522 is feedback to S524 which calculates a correlation between the theoretical SSII and the actual measured error power.

In S528, the actual measure error power receives signal from the equalizer (430) and from the decision unit (440) where the equalizer (430) outputs the signal containing error components and the decision unit (440) does not contain error components. The difference between the signals obtained from the equalizer (430) and the decision unit (440) would constitute the measured error power in S528. The correlation value (R) between the calculated SSII and the measure error power would then be used in S526 for the dynamic chirp estimation, α1. The α1 is then used to calculate the theoretical SSII to complete the feedback loop.

In S532, the RX SSII reconstruction module (530) receives signal from the theoretical SSII calculation from the step S522 and performs the amplitude and phase adjustments in order to obtain the SSII value in S534 in order to be forwarded to the subtracting unit (425). The calculated SSII value in S534 is fed to subtracting unit (425) which performs subtraction of the SSII component from the frequency domain input signal after the FFT (420). It should be noted that the purpose of the subtractor (425) is to perform cancellation for the SSII so that in another embodiment, the subtractor may be replaced by an adder which adds a negative interference signal. Also the subtractor 425 may perform SSII cancellation iteratively which could produce more and more accurate data after each iteration.

For the second interation for instance, in S512, the Tx signal reconstruction module (510) once again receives decision data and equalizer data and output the resulting signal from step S516 to the theoretical SSII calculation module 520 in order that the theoretical SSII is once again constructed according to equation 3 based on the input signal from the operation of S516 and also based on the input of a dynamic chirp estimation. The dynamic chirp value, $\alpha 1$, would once again be iteratively searched and resulting in a theoretically calculated SSII which correlates strongly with the measured error power. The RX SSII reconstruction module (530) then receives signal from the theoretical SSII calculation and once again performs the amplitude and phase adjustments in order to obtain the SSII value which is forwarded to the subtracting unit (425). The process could then repeats for subsequent interations.

Figure 6:
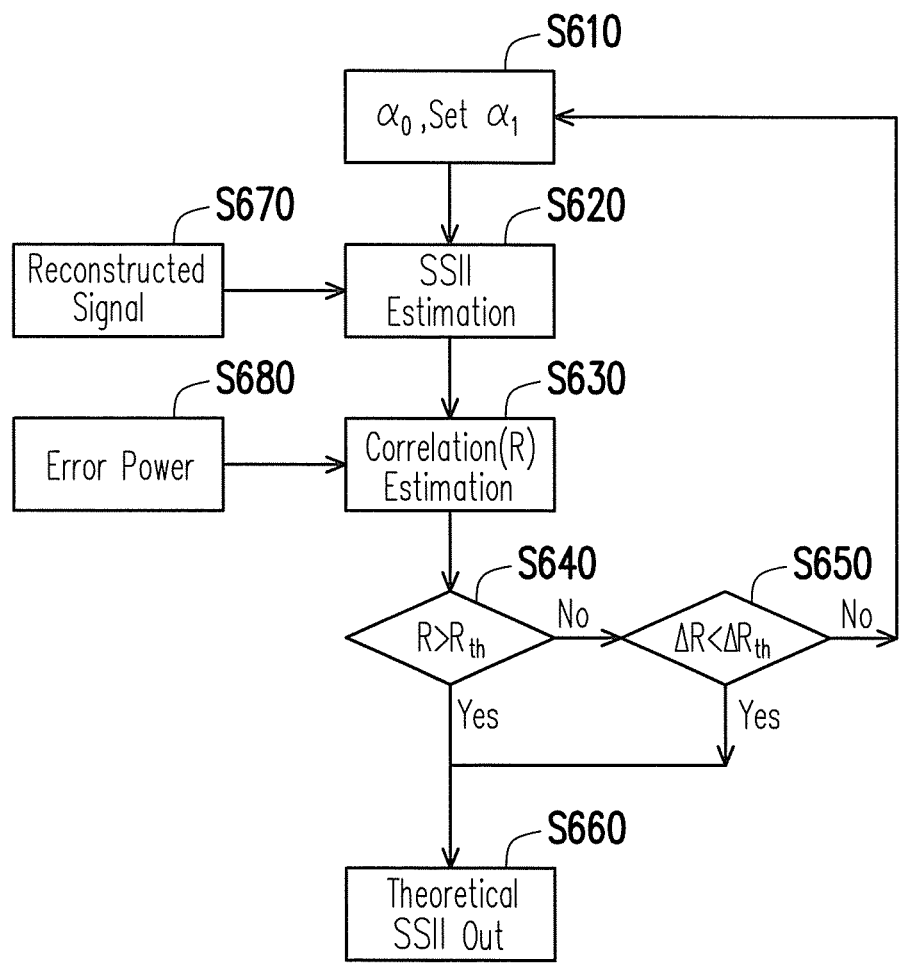
FIG. 6 illustrates a theoretical SSII calculation flow chart in accordance with an exemplary embodiment of the present disclosure.

FIG. 6 illustrates a theoretical SSII calculation flow chart for the theoretical SSII calculation module (520) in accordance with an exemplary embodiment of the present disclosure. First step S610, the dynamic $\alpha 1$ is initially set based on a known $\alpha 0$ value, which is the inherently static chirp value of an IMDD modulator. The $\alpha 0$ value is a constant which can be known when a modulator is manufactured in a factory. For an $\alpha 0$ which could be, for example $\alpha 0 = 0.53$, an $\alpha 1$ could be first selected based on a randomly selected set of $\alpha 1$ values. The $\alpha 1$ value is then used to estimate SSII. In S670, the reconstructed signal is obtained and used for the SSII estimation in S620. The reconstructed signal in S670 is the signal outputted from the Tx Signal Reconstruction module (510). In S680, the error power is the measured error power obtained from S528. In S620, the SSII estimation is performed based on inputs from the $\alpha 1$ value of S610 and the reconstructed transmission signal from S670. The step S620 could be equivalent to the step S522.

In S630, a correlation (R) estimation is performed between the estimated SSII value from S620 and the error power from S680. In S630, the correlation R is calculated according to equation 4 as follows:

$$R = \frac{|\langle X - \tilde{X}, Y - \tilde{Y} \rangle|}{\sqrt{\sum_n |X_n - \tilde{X}|^2} \cdot \sqrt{\sum_n |Y_n - \tilde{Y}|^2}} \quad \text{eq(4)}$$

Wherein, X is the signal power from S620, $\tilde{X}$ is the average of X, Y is the measure error power from S680, and $\tilde{Y}$ is the average of Y.

After the correlation value R is calculated in S630, R is compared with a predetermined threshold value, $R_{th}$. If R is greater than $R_{th}$, then it is determined that there is sufficient correlation between the measured error power in S680 and the estimated SSII in S620 for the selected $\alpha 1$. Otherwise if the correlation value R is not greater than threshold value $R_{th}$, then the process moves to S650. In S650, the $\Delta R$ value is compared with the $\Delta R_{th}$ value. The $\Delta R$ is the change of the correlation value R from the R value of a previous iteration. In other words, $\Delta R$ is the difference between the current iteration of R value estimated in S630 and the R value of a previous iteration. $\Delta R_{th}$ is a predetermined threshold set for $\Delta R$. Therefore, in S650 if $\Delta R$ is less than the $\Delta R_{th}$ then the process moves to S660 in which the theoretical SSII output is determined based on the current selection of $\alpha 1$. Otherwise, if the $\Delta R$ is not less than $\Delta R_{th}$, then $\alpha 1$ is re-adjusted so as to perform another iteration of R calculation based on the selected $\alpha 1$ value. For the subsequent iterations, for example, steps S620-S680 would be performed repeated with at least one or more different $\alpha 1$ values until the steps in S640 or S650 result in a yes. In that case, the selected $\alpha 1$ value would be used for the theoretical SSII output in step S660.

Please note that each blocks of FIGS. 4, 5, and 6 could be realized using hardware implementations. Each of these blocks could be separately designed on separate circuit boards and be integrated with the optical communication device 300.

Figure 7:
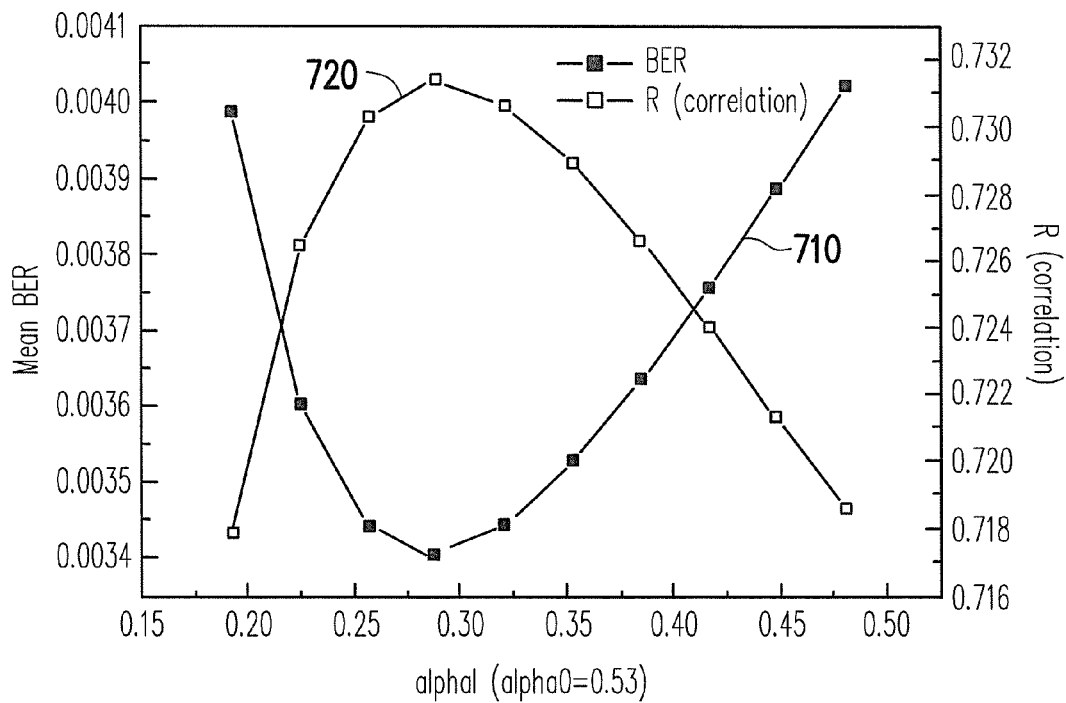
FIG. 7 illustrates the relationships among the correlation value (R), the dynamic chirp value $\alpha 1$, and measured error rate in accordance with an exemplary embodiment of the present disclosure.

FIG. 7 illustrates the relationships among the correlation value (R), the dynamic chirp value $\alpha 1$, and measured error rate in accordance with an exemplary embodiment of the present disclosure. Please note that FIG. 7 constitutes an example for an arbitrary modulator and the diagram can vary for a different modulator. The curve of correlation R values (720) as a function of $\alpha 1$ based on a static $\alpha 0$ is inversely related to the mean bit error rate (710). For a modulator having $\alpha 0 = 0.53$, the dynamic alpha, $\alpha 1$, can be selected in order to obtain the highest R value, and subsequently the most accurate SSII signal component. For this particular example, the $R_{th}$ can be set as 0.728 and $\Delta R_{th}$ can be set as 0.001. Using the relationship of FIG. 7, the $\alpha 1$ can first be randomly selected set of numbers between 0 and 1. When R value is largest, the best BER can be obtained.

Figure 8:
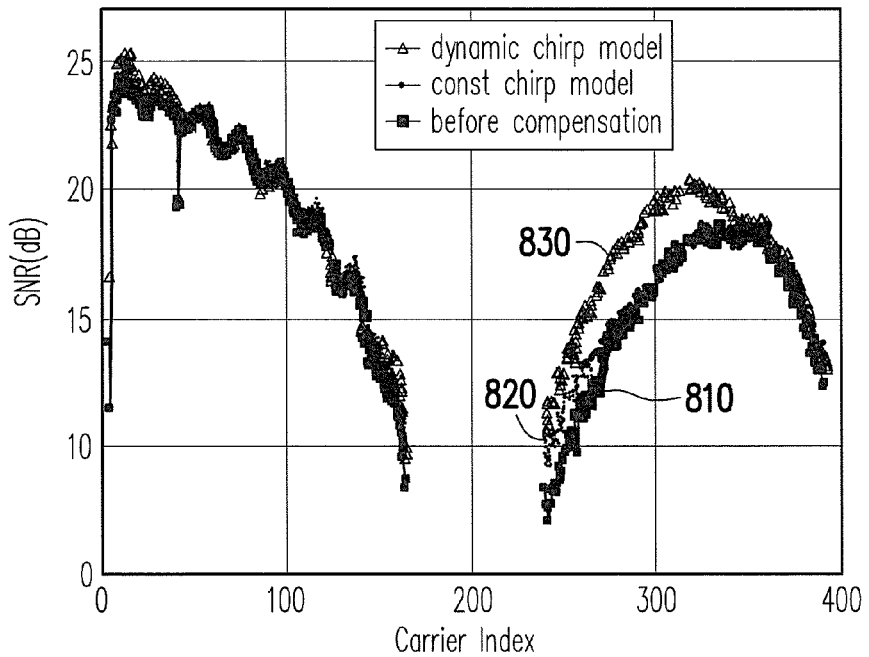
FIG. 8 illustrates the SNR data of an actual experiment using different embodiments.

FIG. 8 illustrates the SNR data of an actual experiment using different embodiments. The modulation scheme used for this experiment is OFDM 16 QAM. The propagation length is 100 km of fiber. The lower frequency band spans between 0.1-3.9 GHz, and the upper frequency band spans between 5.6-9.2 GHz. Within the lower frequency band, there are not noticeable differences among signal without any compensation (810), signal compensated by $\alpha 0$, and signal compensated by $\alpha 0$ and $\alpha 1$. However, for the higher frequency spectrum, the signal without any compensation (810) exhibits the worst SSII degradation. The signal (820) is compensated by $\alpha 0$ shows only slight improvement at the beginning part of the higher frequency spectrum. Signal compensated by both $\alpha 0$ and $\alpha 1$ shows the best SNR performance and improves SNR by 2-3 dB.

The signal bandwidth of a conventional IMDD based system is not only limited by RF fading but also adversely affected by the SSII in the higher frequency spectrum. In view of the aforementioned descriptions, the present disclosure is able to improve transmission bandwidth of orthogonal frequency division multiplexed (OFDM) signals by first calculating the theoretical SSII in the received signals and then subtracting the theoretical SSII from the received signals. The SSII can be calculated according to a signal after fiber mathematical model by taking into account a static chirp value and a dynamic chirp value of the modulator. The dynamic chirp value can be fine tuned based on an initial SSII estimation in comparison with a correlation estimation with an actual measure power signal and thus further improves the accuracy of the estimated SSII signal. Based on the theoretical model verified by experimental results, the overall SNR of the system has been improved. After SSII is cancelled from the received signals, the useful bandwidth of transmitting signals over 100 km of fiber may increase by another two GHz.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method of receiving optical signals for an optical communication device, the method comprising:
   receiving from an optical receiver an input signal comprising a signal component and an interference component, wherein the interference component is subcarrier to subcarrier intermixing interference (SSII);
   converting the input signal into a frequency domain input signal;
   estimating the interference component according to at least a dynamic chirp component and a static chirp component; and
   cancelling the interference component from the frequency domain input signal to obtain a second signal.

2. The method of claim 1, wherein the method further comprises:
   performing an equalization for the second signal to produce an equalized second signal; and
   performing a decision for the equalized second signal to produce an output signal.

3. The method of claim 2, wherein the element of estimating the interference component according to at least the dynamic chirp component and the static chirp component further comprising:
   calculating the interference component according to the equalized second signal and the output signal.

4. The method of claim 3, wherein the element of estimating the interference component according to at least the dynamic chirp component and the static chirp component comprising:
   reconstructing a first signal which is from a modulator;
   calculating a theoretical SSII based on the first signal and the dynamic chirp component according to a mathematical model; and
   performing an amplitude and a phase adjustment to the theoretical SSII to reconstruct the interference component.

5. The method of claim 4, wherein the element of calculating the theoretical SSII based on the first signal and the dynamic chirp component according to the mathematical model further comprises:
   measuring an error power of the frequency domain input signal;
   calculating a correlation between the error power and the theoretical SSII; and
   outputting the theoretical SSII if the correlation is greater than a first threshold.

6. The method of claim 5 further comprising:
   if the correlation is not greater than the first threshold,
   determining if a change of the correlation from a previous correlation is smaller than a second threshold; and
   if the change of the correlation from the previous correlation is smaller than the second threshold, outputting the theoretical SSII.

7. The method of claim 6 further comprising:
   if the change of the correlation from the previous correlation is not smaller than the second threshold, adjusting the dynamic chirp component to become a selected dynamic chirp and repeating calculating the theoretical SSII based on the first signal and the dynamic chirp component according to the mathematical model.

8. The method of claim 1, wherein before the element of estimating the interference component according to at least the dynamic chirp component and the static chirp component; the method further comprises:
   initializing the dynamic chirp component from a randomly selected set of numbers between 0 and 1.

9. The method of claim 5, wherein the element of measuring the error power of the frequency domain input signal comprises:
   obtaining the error power of the frequency domain input signal based on a difference between the output signal and the equalized second signal.

10. The method of claim 1, wherein the element of receiving from the optical receiver the input signal comprising the signal component and the interference component comprising:
    receiving from the optical receiver an optical signal which travels through a fiber; and
    performing a direct detection on the optical signal to obtain the input signal.

11. An optical communication device comprising:
    a receiver receiving an input signal comprising a signal component and an interference component, wherein the interference component is subcarrier to subcarrier intermixing interference (SSII); and
    a processing unit coupled to the receiver and is configured to perform the functions of converting the input signal into a frequency domain input signal, estimating the interference component according to at least a dynamic chirp component and a static chirp component, and cancelling the interference component from the frequency domain input signal to obtain a second signal.

12. The device of claim 11 wherein the processing unit is further configured to perform the function of performing an equalization for the second signal to produce an equalized second signal and performing a decision for the equalized second signal to produce an output signal.

13. The device of claim 12, wherein the processing unit is further configured to perform the function of:
    calculating the interference component according to the equalized second signal and the output signal.

14. The device of claim 13, wherein the processing unit is configured to perform the function of estimating the interference component according to at least the dynamic chirp component and the static chirp component, the function comprising:
    reconstructing a first signal which is from a modulator, calculating a theoretical SSII based on the first signal and the dynamic chirp component according to a mathematical model, and performing an amplitude and a phase adjustment to the theoretical SSII to reconstruct the interference component.

15. The device of claim 14, wherein the processing unit is configured to perform the function of calculating the theoretical SSII based on the first signal and the dynamic chirp component according to the mathematical model, the function further comprises:
    measuring an error power of the frequency domain input signal, calculating a correlation between the error power and the theoretical SSII, and outputting the theoretical SSII if the correlation is greater than a first threshold.

16. The device of claim 15, wherein the processing unit is further configured to perform the function of:
    if the correlation is not greater than the first threshold, determining if a change of the correlation from a previous correlation is smaller than a second threshold; and
    if the change of the correlation from the previous correlation is smaller than the second threshold, outputting the theoretical SSII.

17. The device of claim 16, wherein the processing unit is further configured to perform the function of:
- if the change of the correlation from the previous correlation is not smaller than the second threshold, adjusting the dynamic chirp component to become a selected dynamic chirp and repeating calculating the theoretical SSII based on the first signal and the dynamic chirp component according to the mathematical model.

18. The device of claim 11, wherein before the processing unit is configured to perform the function of estimating the interference component according to at least the dynamic chirp component and the static chirp component; the processing unit is further configured for:
- initializing the dynamic chirp component from a randomly selected set of numbers between 0 and 1.

19. The device of claim 15, wherein the processing unit is configured to perform the function of measuring the error power of the frequency domain input signal comprises:
- obtaining the error power of the frequency domain input signal based on a difference the output signal and the equalized second signal.

20. The device of claim 11, wherein device further comprises an photo detector receiving an optical signal which travels through a fiber, and performing a direct detection on the optical signal to obtain the input signal.

21. An optical communication device comprising:
- a receiver receiving an input signal comprising a signal component and an interference component, wherein the interference component is subcarrier to subcarrier intermixing interference (SSII);
- a fourier transform unit coupled to the receiver and converts the input signal into a frequency domain input signal;
- a SSII calculation unit coupled to the fourier transform unit and estimates the interference component according to at least a dynamic chirp component and a static chirp component; and
- a canceling unit coupled to the SSII calculation unit and the fourier transform unit and cancels the interference component from the frequency domain input signal to obtain a second signal.

22. The device of claim 21 further comprising:
- an equalizer unit coupled to the canceling unit and the SSII calculation unit and performs an equalization for the second signal to produce an equalized second signal; and
- a decision unit coupled to the equalizer unit and the SSII calculation unit and performs a decision for the equalized second signal to produce an output signal.

23. The device of claim 22, wherein the SSII calculation unit further performs the function of:
- calculating the interference component according to the equalized second signal and the output signal.

24. The device of claim 23, wherein the SSII calculation unit comprises
- a TX signal reconstruction module which reconstructs a first signal which is from a modulator;
- a theoretical SSII calculation module which calculates a theoretical SSII based on the first signal and the dynamic chirp component according to a mathematical model; and
- a RX reconstruction module which performs an amplitude and a phase adjustment to the theoretical SSII to reconstruct the interference component.

25. The device of claim 24, wherein the theoretical SSII calculation module further comprises the function of measuring an error power of the frequency domain input signal, calculates a correlation between the error power and the theoretical SSII, and outputs the theoretical SSII if the correlation is greater than a first threshold.

26. The device of claim 25, wherein theoretical SSII calculation module further comprises the function of:
- if the correlation is not greater than the first threshold, determining if a change of the correlation from a previous correlation is smaller than a second threshold; and
- if the change of the correlation from the previous correlation is smaller than the second threshold, outputting the theoretical SSII.

27. The device of claim 26, wherein theoretical SSII calculation module further comprises the function of:
- if the change of the correlation from the previous correlation is not smaller than the second threshold, adjusting the dynamic chirp component to become a selected dynamic chirp and repeating calculating the theoretical SSII based on the first signal and the dynamic chirp component according to the mathematical model.

28. The device of claim 25, wherein theoretical SSII calculation module further comprises the function of obtaining the error power of the frequency domain input signal based on a difference between the output signal and the equalized second signal.

29. The device of claim 21, wherein the SSII calculation unit further comprises the function of:
- initializing the dynamic chirp component from a randomly selected set of numbers between 0 and 1.

30. The device of claim 21, wherein device further comprises an photo detector receiving an optical signal which travels through a fiber, and performing a direct detection on the optical signal to obtain the input signal.

* * * * *